UNITED STATES PATENT OFFICE.

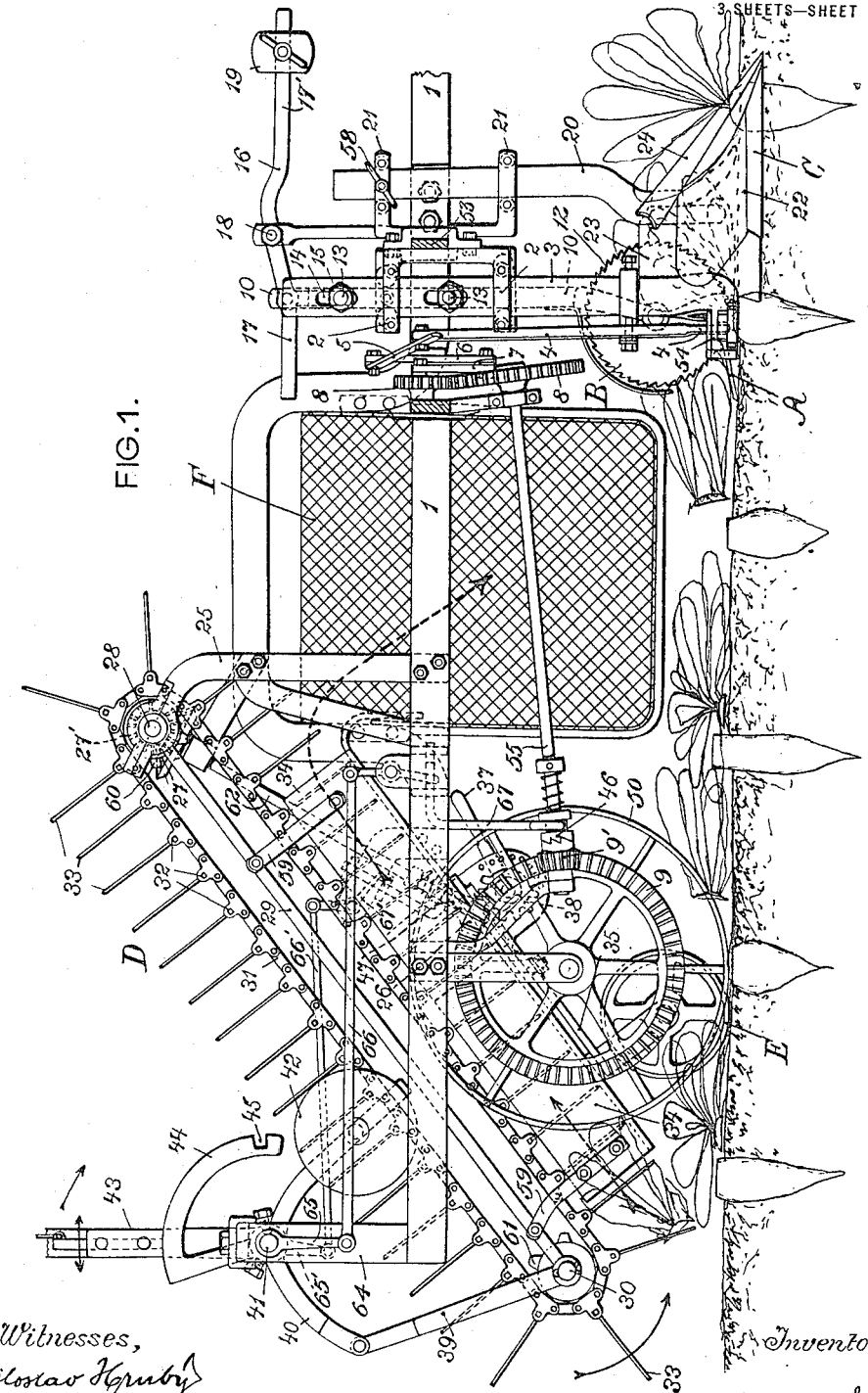

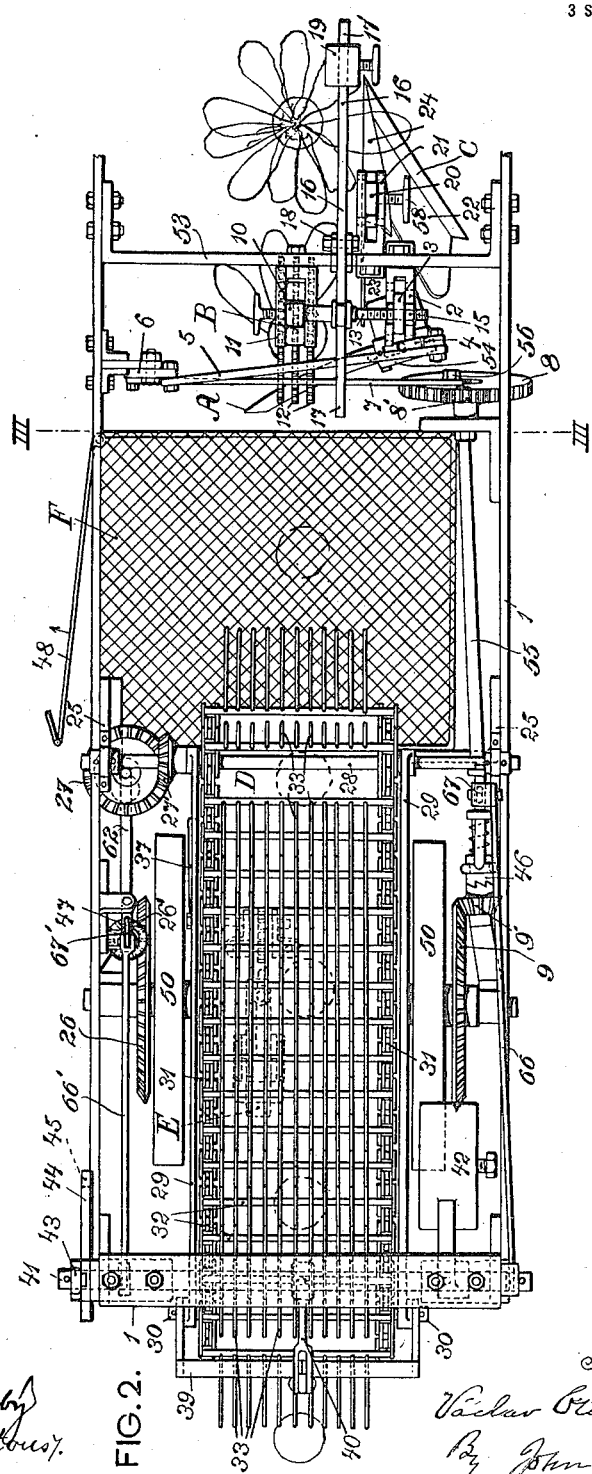

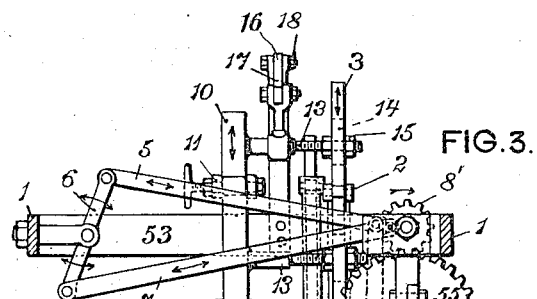

VÁCLAV OTAKAR DEYL, OF PRAGUE, AUSTRIA-HUNGARY.

BEET-TOPPING MACHINE.

1,165,763.

Specification of Letters Patent.

Patented Dec. 28, 1915.

Application filed June 7, 1913. Serial No. 772,384.

*To all whom it may concern:*

Be it known that I, VÁCLAV OTAKAR DEYL, a subject of the Emperor of Austria-Hungary, residing at Prague, Bohemia, Austria-Hungary, have invented certain new and useful Improvements in Beet-Topping Machines, of which the following is a specification.

This invention relates to machines for topping beets and similar vegetables.

It relates particularly to the peculiar manner of supporting and operating the knife which severs the crowns or tops of the vegetables; to the gage wheel employed for regulating the height at which the knife shall operate; to means for regulating the force or pressure with which the gage wheel bears upon the surfaces over which it travels; to means for clearing a track or path in front of the knife, particularly the part thereof with which the operating mechanism is connected, so that it will not become clogged by earth, leaves or other material; and to means for collecting the severed tops or crowns of the beets or other vegetables. These several features will be more particularly described in the following specification. In such specification I employ the term "beets" to designate the vegetables acted upon by the machine herein described though it is to be understood that I do not intend thereby to limit the use to which my invention may be put to that particular vegetable.

In the accompanying drawings I have illustrated the invention as embodied in a beet topping machine.

Referring to such drawings Figure 1 is a side elevation partly in longitudinal section, of a beet topping machine embodying my improvements; Fig. 2 is a top plan view of the same; Fig. 3 is a transverse vertical section taken on the line III—III of Fig. 2. Fig. 4 is a horizontal sectional view taken on the line IV—IV of Fig. 3; and Figs. 5 and 6 are detail views illustrating the devices for collecting and conveying the severed tops.

In these drawings 1 designates the frame of the machine, and 50 the main supporting and driving wheels. Toward the front of the machine and supported upon a transverse frame piece 53 are the roller guides 2 in which is supported the vertically adjustable stem 3 that carries at its lower end the knife A. The lower end of the stem is preferably forked and bent backward horizontally to provide a broad and strong bearing 54 for the knife. This bearing is so disposed and the knife A so shaped that the latter lies transverse to the line of movement of the machine but inclined to the rear so as to impart a shear cut to the beets. The knife is reciprocated and I prefer to employ the following mechanism for that purpose. One of the ground wheels 50 carries a bevel gear wheel 9 with which meshes a pinion 9' supported upon a shaft 55 that extends forward and is suitably supported. At the forward end of the shaft 55 is a gear wheel 8 with which meshes a pinion 8' that carries a wrist pin 56 to which is connected a pitman 7, which in turn is connected with a two armed lever 6. With that arm of the lever opposite the one with which the pitman is connected, a link 5 is connected and this at its opposite end is connected with the vertically arranged lever 4 that imparts motion directly to the knife. The knife is slotted, as indicated at 57, 57 and through these slots extend guide pins carried by the bearing 54, for the purpose of guiding and steadying the knife in its operations.

Adjacent to the stem or standard 3 is a second supporting stem or standard 10, in which is mounted the gage wheel B, the lower end of such standard being preferably bifurcated in order to provide bearings for the supporting shaft of the gage wheel. This standard 10 is supported in roller guides 11 so that it is free to move up and down with a minimum of friction. The gage B consists of one or more toothed wheels 12 mounted side by side but preferably spaced somewhat apart, upon the horizontal shaft. These wheels are adapted to roll along the surface of the ground and over the beets the tops or crowns of which are to be severed. It will be evident that the vertical position of the gage wheel, and of the stem or standard 10 supporting it, varies accordingly as the tops of the beets are more or less above the surface of the ground. The two stems or standards 3 and 10 are connected so as to move vertically together, and I prefer to employ for this purpose bolts 13 set rigidly in the standard 10 and passing through slots 14 formed in the standard 3. This arrangement permits relative adjustment of the two standards, they being secured rigidly together under working conditions by the nuts 15 on the bolts 13.

It will be seen that the gage wheel is so disposed on the machine that it travels directly along the row of beets being topped, and that the support for the knife A is laterally offset relative thereto, that is, located at one side of the gage wheel. The knife itself extends across the path of the gage wheel and in rear thereof so that it can follow the wheel closely and yet be supported and operated without interference from the gage wheel and the supports of the latter and without requiring the knife support to straddle the gage wheel. I thus am enabled to mount and operate a shear-cutting knife in a simple manner and also arrange the cutting portion of such knife very close to the gage wheel with the manifest advantages incident to such location.

I have found it desirable owing to the varying nature of the foliage of the beets, whether luxuriant or scant, or erect or recumbent, to provide means for varying the force with which the gage wheel or wheels bear upon the surfaces and objects over which they travel, because as will be apparent, a less force is required to cause the gage to bear directly upon the heads of the beets when the foliage is scant than when it is luxuriant and stands erect. It is also sometimes desirable to vary the number of wheels 12, employing a less number when the foliage is luxuriant and a greater number when it is scant. The means for controlling the force with which the gage wheel bears will now be described.

16 indicates a lever supported upon a fulcrum 18 in a bracket or frame rising from the main frame of the machine, and connected with one of the bolts 13 uniting the two standards 3 and 10. The lever 16 has two arms 17, 17' extending in opposite directions from its fulcrum, to either of which may be applied a weight 19. When the weight is applied to the forwardly extending arm 17' of the lever, as shown in Fig. 1, it operates to oppose its own weight to that of the gage wheel so that the latter bears with correspondingly less force upon the surfaces over which it travels; while if applied to the rearwardly extending arm 17 it adds its weight to that of the gage wheel and increases the pressure with which the latter bears upon its supporting surfaces. It is apparent that a wide variation in the amount of pressure of the gage wheel can be thus provided for by changing the weight from one arm of the lever to the other, and by adjusting it upon the arms as occasion may require.

It will be apparent without further explanation that when the gage wheel passes over a beet that stands high out of the ground it and the knife will be raised and the crown severed a certain determined distance below the top of the beet and that the next beet over which the gage wheel may pass, whether its top be higher or lower than that of the one preceding, will be severed the same distance from the top, this fact being clearly indicated in Fig. 1 of the drawings. The amount severed by the knife A will be determined by the relative vertical adjustment of the standard carrying the knife as compared with the standard carrying the gage wheel, this being provided for by slotting the standard 3 at 14, 14, as already described.

It is apparent that the machine may be made to work reliably even where the rows of beets are not quite straight by the use of a plurality of wheels 12, thus giving considerable transverse dimension to the gage, for even if but one of the wheels 12 engages with the beet, the gage operates.

In front of that end of the knife to which the driving mechanism therefor is connected is situated a track clearer, designated as a whole by C. It is apparent that such track clearer must be to one side of, though not far distant from, the row of beets. This track clearer consists of a sort of plow adapted to remove to one side a little of the earth along the path followed by the driven end of the knife and arranged also to deflect, in a direction opposite to that in which the soil is moved, the leaves of the beets. This track clearer is carried by a standard 20, supported in bearings 21 carried by the frame of the machine, the standard being vertically adjustable in such bearings, and there being provided means such as a set bolt 58 for securing the standard in place after it has been properly adjusted. The track clearer consists of a share 22, arranged to lift and turn a shallow layer of the soil outward to one side, a vertical flat inner guard 23, and an upwardly curved guard 24 at the forward edge of the guard plate 23 overlying its junction with the share 22. The knife bearing 54 lies quite close to the track clearer and between the share 22 and the vertical guard plate 23 as indicated in Figs. 3 and 4. The guard 24, which extends downward well toward the point of the share, operates to pick up and turn inward the leaves of the beets, after which they are held out of the way of the knife operating mechanism by the vertical guard plate 23 until the knife has been so far advanced that practically all danger of clogging its operating mechanism is passed.

The severed tops are valuable as cattle feed and I have provided means for collecting them which I will now describe. Such means consist of a means for picking up and conveying the tops, represented as a whole by D, a support for maintaining the picking up end of the said device at the proper vertical distance above the ground, designated E, and a collecting receptacle F. The picking up and conveying mechanism is located at the extreme rear of the machine and delivers the tops forwardly and upwardly into the receptacle F which is located between the mechanism D and the gage and cutter mechanism.

25 indicates an upwardly extending frame located at about the center of the machine. In it is supported a cross shaft 28 and upon this shaft is hung the frame of the picking up and conveying mechanism which consists of the side bars 29, 29, extending downwardly and rearwardly from the shaft 28, across shaft 30 extending between and connecting the side frame pieces at their lower rear ends, and a trough 34 for the conveyer supported from the side bars 29 by the brackets 59. The conveyer consists essentially of a pair of endless chains 31, 31, supported upon sprocket wheels 60 carried by the upper cross shaft 28, and sprocket wheels 61 on the lower cross shaft 30, and tines 33 projecting outwardly from cross bars 32 extending between the chains. The lower run of, and upwardly moving, tines travel in the trough 34 the bottom of which is slatted or otherwise made open to permit earth and loose material to sift out as the tops are being elevated. The tines as they pass about the lower shaft 30 come quite close to the surface of the ground and operate to pick up the tops, lifting them into the trough 34 along which they are transported and finally delivered into the basket or receptacle F. The conveyer just described is preferably driven through the following train of gearing.

26 indicates a bevel wheel secured to one of the ground wheels 50, with which meshes a pinion 26' supported upon a shaft 62, that carries at its upper end a bevel gear wheel 27 that in turn meshes with a bevel pinion 27' upon the upper cross shaft 28. The proportions of the several gear wheels are such that a comparatively rapid motion is imparted to the conveyer chains 31, thus insuring that the tines 33 which they carry become effective means for picking up as well as conveying the severed tops.

The picking up and conveying mechanism D, considered as a whole, is free to swing about the upper shaft 28 as a fulcrum and is sustained by ground wheel E with the lower end at a determined distance from the surface of the ground. The wheel E is supported in a suitable bracket or bearing carried by a bar 35, secured to the bottom of the trough 34 and adjustable lengthwise thereof. This bar is provided with a rack 36 with which engages a toothed segment 38 mounted on a suitable shaft to which is secured an adjusting handle 37. It will be seen by reference to Figs. 5 and 6 that the position of the wheel E, and hence the inclination of the conveying apparatus and the distance of its picking up end from the ground, may be varied by adjusting the bar 35, suitable means such as indicated at 63 are employed for holding these parts in the position to which they may be adjusted.

64 indicates a transverse frame rising from the rear end of the main frame work 1. In it is mounted a shaft 41 from which extends an arm 40 that is connected, by a stirrup or fork 39, with the rear end of the frame for the pick up and conveying devices. The shaft 41 has secured to it an adjusting lever 43 that is provided with a latch adapted to engage with a notch 45 formed in a segment 44 carried by the frame 64. By means of the devices just described the pick up and conveying apparatus can be lifted and held above the ground in a position so as to be inoperative.

42 indicates a weight connected with the shaft 41 and arranged to counter-balance the pick up and conveying mechanism D so that the full weight of the latter is not carried by the adjustable supporting wheel E.

I interpose clutch mechanisms 46 and 47 in the lines of power transmission devices that operate respectively the knife A and the pick up and conveying devices D, and I connect the shifters for operating such clutches with the shaft 41 so that whenever the pick up and conveying devices are elevated and thrown out of working position the other moving parts of the apparatus, that is the knife operating mechanism and the conveyor operating mechanism, will be simultaneously thrown out of working condition.

65, 65' indicate arms secured fast to the shaft 41, and 66, 66' represent links connecting these arms with the shifting devices 67, 67' for the clutches 46 and 47 respectively.

48 designates a door with which the receptacle or collecting basket F is provided, it being arranged so that when opened it will give free access to the said receptacle.

The machine described may be used in connection with a machine or mechanism for lifting the beets the crowns of which have been severed and collected by the machine described, but as such lifting device forms no part of my present invention, and any suitable type thereof may be employed, I will not here describe the same.

It will be seen that the support for the knife or cutter A is guided so that it moves in straight up and down lines. From this it follows that the knife having once been adjusted to a horizontal position, maintains such position under all conditions of adjustment. In other words the knife may be adjusted and maintained so as to cut in a plane parallel with that along which the machine moves under all conditions, a fact that is not true of those machines in which the cutter or cutters are mounted in a pivoted frame free to move vertically, where the angle of the cutting edge is constantly changed as the supporting frame moves up or down. It will also be seen that the track clearer C removes the soil and other obstructions so that the support 54 for the end of the knife with which the means that operate it are connected may be brought down to the level of the surrounding soil or even carried slightly below such level without being interfered with, as when it becomes necessary to make a cut low down or approximating the level of the soil surface.

What I claim is:—

1. In a beet topping machine, a knife for severing the tops, a gage device for regulating the horizontal plane at which the knife shall cut, a support for the knife laterally offset relative to the gage device, the knife extending therefrom directly behind and close to the gage device, and means for connecting the gage device and the support for the knife whereby they are caused to rise and fall together.

2. In a beet topping machine, a reciprocating knife for severing the tops, a gage device for regulating the horizontal plane at which the knife shall cut arranged to engage with the tops of the beets, a support for the knife laterally offset relative to the gage device and connected therewith so that the two rise and fall together, and means for reciprocating the knife, the knife extending from its support directly behind and close to the said gage device.

3. In a beet topping machine, a gage device adapted to engage with the tops of the beets, a knife support laterally offset relative thereto having at its lower end a broad bearing, a reciprocating knife supported in said bearing and extending therefrom directly behind and close to the gage device, means for reciprocating the knife including a vertically disposed lever whose lower end is connected with the knife, and means connecting the gage device and knife whereby these rise and fall together.

4. In a beet topping machine, the combination of a horizontally disposed knife, a vertical stem supporting the knife, vertical guides in which the stem is mounted, a gage, a stem supporting the gage, vertical guides for the stem of the gage, the support for the knife being laterally offset relative to the gage and the knife extending therefrom directly behind and close to the gage, means for rigidly connecting together the stems of the knife and gage, such means permitting a vertical adjustment of one relative to the other, and means for reciprocating the knife mounted upon the support therefor and movable up and down therewith.

5. In a beet topping machine, the combination of a horizontally disposed knife for severing the tops, a gage wheel for determining the horizontal plane at which the knife shall cut, a vertically movable support in which the gage wheel is mounted, a lever having arms extending in opposite directions from its fulcrum, each arm being constructed to have easily applied to it and removed therefrom a weight and one arm being connected with the support that carries the gage wheel, and a weight adapted to be applied at will to one or the other arm of the said lever, substantially as and for the purposes set forth.

6. In a beet topping machine, the combination of a main supporting frame, a horizontally disposed knife for severing the beet tops, a support in which the knife is mounted and in which it is free to reciprocate horizontally, a gage for determining the horizontal plane at which the knife shall cut, upright stems carrying respectively the gage and the knife support, means for connecting said stems rigidly together, vertical guides for the said stems, an upright lever for reciprocating the knife fulcrumed upon one of the said upright stems and power driven mechanism for operating the said lever supported upon the main frame of the machine.

7. In a beet topping machine, the combination of a horizontally disposed knife for severing the tops, a support in which one end of the knife is mounted, and in which it is free to reciprocate, means for imparting reciprocatory movements to the knife connected therewith at the said support, and a soil removing track clearer arranged directly in front of the support of the knife.

8. In a beet topping machine, the combination of a horizontally disposed knife for severing the tops, a support in which one end of the knife is mounted and in which it is free to reciprocate, means for imparting reciprocatory movements to the knife connected therewith at the said support, and a soil removing track clearer arranged directly in front of the support of the knife, the said track clearer being provided with a curved guard 24 arranged to pick up and turn inward the leaves of the beets.

VÁCLAV OTAKAR DEYL.

Signed in the presence of—
MILOSLAV HRUBÝ,
JOHN L. BOUCHAL.

Copies of this patent may be obtained for five cents each, by addressing the "Commissioner of Patents, Washington, D. C."